(12) United States Patent　　(10) Patent No.: US 9,339,007 B2
Roth　　(45) Date of Patent: May 17, 2016

(54) FEEDING DISHES AND METHODS FOR FEEDING A SUBJECT

(71) Applicant: Cool Gear International, LLC, Plymouth, MA (US)

(72) Inventor: Donna Roth, Duxbury, MA (US)

(73) Assignee: Cool Gear International, LLC, Plymouth, MA (US)

( * ) Notice: Subject to any disclaimer, the term of this patent is extended or adjusted under 35 U.S.C. 154(b) by 0 days.

(21) Appl. No.: 13/686,276

(22) Filed: Nov. 27, 2012

(65) Prior Publication Data

US 2013/0081574 A1　Apr. 4, 2013

Related U.S. Application Data

(63) Continuation of application No. PCT/US2011/035328, filed on May 5, 2011.

(60) Provisional application No. 61/348,980, filed on May 27, 2010.

(51) Int. Cl.
*A01K 5/00*　　(2006.01)
*A01K 5/01*　　(2006.01)

(52) U.S. Cl.
CPC ................. *A01K 5/00* (2013.01); *A01K 5/0128* (2013.01)

(58) Field of Classification Search
CPC ......... A01K 7/027; A01K 7/00; A01K 5/128; A01K 5/0114; A01K 5/0128; A01K 5/00; A47G 19/027; F25D 2303/083; F25D 1303/0831
USPC ........ 119/61.52, 61.5; 220/574.2, 574.3, 574; 62/457.2, 457.9
See application file for complete search history.

(56) References Cited

U.S. PATENT DOCUMENTS

| 1,369,367 | A | * | 2/1921 | Thomson | ................. 220/592.14 |
| 3,302,428 | A | | 2/1967 | Stoner et al. | |
| 3,698,594 | A | * | 10/1972 | Boehlert | ................. 220/495.01 |
| 3,749,063 | A | | 7/1973 | Buffum | |
| 3,757,852 | A | | 9/1973 | Allinger | |
| 3,858,410 | A | | 1/1975 | Drake | |
| 4,085,706 | A | * | 4/1978 | Evans | ........................ 119/61.54 |
| 4,306,424 | A | | 12/1981 | Chavoor | |

(Continued)

FOREIGN PATENT DOCUMENTS

WO　　2005018312 A1　　3/2005

OTHER PUBLICATIONS

"Eco Temp Dog Bowls" Pet-Super-Store.com, May 11, 2010.

(Continued)

*Primary Examiner* — Kathleen Alker
(74) *Attorney, Agent, or Firm* — Mintz Levin Cohn Ferris Glovsky and Popeo, P.C.; Steven M. Jensen

(57) ABSTRACT

Feeding dishes and methods of feeding a subject are provided. One aspect of the invention provides a feeding dish including: a freezable dish adapted to receive food and a base adapted to receive the freezable dish. Another aspect of the invention provides a method for feeding a subject. The method includes: providing a feeding dish including a freezable dish adapted to receive food and a base adapted to receive the freezable dish, cooling the freezable dish, placing the food in the freezable dish, and placing the freezable dish in the base.

11 Claims, 4 Drawing Sheets

(56) References Cited

U.S. PATENT DOCUMENTS

| | | | |
|---|---|---|---|
| 4,691,664 A | 9/1987 | Crowell | |
| 4,798,173 A | 1/1989 | Wilgren | |
| 4,869,385 A | 9/1989 | Blinsinger | |
| 5,005,524 A | 4/1991 | Berry | |
| 5,065,758 A | 11/1991 | Whitehead et al. | |
| 5,209,184 A | 5/1993 | Sharkan et al. | |
| 5,329,778 A | 7/1994 | Padamsee | |
| 5,488,927 A * | 2/1996 | Lorenzana et al. | 119/51.5 |
| 6,044,797 A * | 4/2000 | Leason et al. | 119/72 |
| 6,125,790 A | 10/2000 | Breedwell | |
| 6,209,487 B1 * | 4/2001 | Quinlan et al. | 119/51.01 |
| 6,230,653 B1 | 5/2001 | Tobin | |
| 6,363,886 B1 | 4/2002 | Statton | |
| 6,434,961 B2 | 8/2002 | Richmond et al. | |
| 6,647,741 B2 * | 11/2003 | Pechous et al. | 62/457.6 |
| 6,672,248 B2 | 1/2004 | Bourigault | |
| 6,786,177 B1 * | 9/2004 | Lemkin | 119/51.01 |
| 6,840,191 B2 * | 1/2005 | Gaspary et al. | 119/61.5 |
| 6,860,229 B1 | 3/2005 | Craft | |
| 7,051,730 B2 * | 5/2006 | Lin | 126/246 |
| 7,207,291 B1 | 4/2007 | Watts | |
| 7,325,679 B2 | 2/2008 | Severa et al. | |
| D589,214 S | 3/2009 | Johnston | |
| 7,527,018 B2 * | 5/2009 | Manley-Hood | 119/61.5 |
| 7,913,648 B2 * | 3/2011 | Maeda | 119/61.52 |
| 8,464,658 B2 * | 6/2013 | Lanter | 119/61.52 |
| 2002/0040585 A1 | 4/2002 | Chaney | |
| 2003/0111472 A1 * | 6/2003 | Lerner | 220/574.2 |
| 2003/0192480 A1 * | 10/2003 | Bennett | 119/61 |
| 2007/0068944 A1 | 3/2007 | McKinney et al. | |
| 2007/0180850 A1 | 8/2007 | Thompson | |
| 2008/0087037 A1 * | 4/2008 | Rapaz | 62/457.2 |
| 2008/0173650 A1 | 7/2008 | Roth et al. | |
| 2009/0041910 A1 * | 2/2009 | Rabinovitch et al. | 426/115 |
| 2010/0018970 A1 * | 1/2010 | Jain | 220/62.11 |
| 2012/0210941 A1 * | 8/2012 | Brown | 119/61.52 |

OTHER PUBLICATIONS

International Search Report for International Application No. PCT/US2011/035328 mailed Feb. 9, 2012.

Written Opinion for International Application No. PCT/US2011/035328 mailed Feb. 9, 2012.

International Preliminary Report on Patentability for International Application No. PCT/US2011/035328 issued Nov. 27, 2012.

* cited by examiner

FEEDING DISHES AND METHODS FOR FEEDING A SUBJECT

CROSS-REFERENCE TO RELATED PATENT APPLICATIONS

This application is a continuation of International Application No. PCT/US2011/035328, filed May 5, 2011, which claims priority to U.S. Provisional Patent Application Ser. No. 61/348,980, filed May 27, 2010. The entire content of this patent application is hereby incorporated herein.

BACKGROUND

Many animals such as dogs and reptiles lack the ability to self-regulate their body temperature through sweating. Thus, such animals can be particularly vulnerable to warm weather.

Further, many pet owners leave a day's supply of food for their pets before leaving home for the day. Such food is vulnerable to spoilage, particularly during warm weather.

Moreover, many frozen or chilled foods such as ice cream, chilled soups, beverages and the like are undesirably warmed by room temperature dishes and/or human contact with the dish.

Accordingly, there is a need to cool food or maintain food at cold temperatures.

SUMMARY OF THE INVENTION

Feeding dishes and methods of feeding a subject are provided.

One aspect of the invention provides a feeding dish including: a freezable dish adapted to receive food and a base adapted to receive the freezable dish.

This aspect of the invention can have a variety of embodiments. The freezable dish can be a bowl or a plate.

The freezable dish can include an inner wall, an outer wall, and a freezable substance received between the inner wall and the outer wall. The freezable substance can be selected from the group consisting of: a liquid, a solid, a gel, and a slurry. The inner wall and the outer wall can be coupled to contain the freezable substance. The inner wall and the outer wall can be coupled by sonic welding.

The inner wall can be fabricated from a material selected from the group consisting of plastic, rubber, and metal. The outer wall can be fabricated from a material selected from the group consisting of plastic, rubber, and metal.

The freezable dish can include a flange adapted to rest on a portion of the base when the freezable dish is placed within the base. The base can include one or more gussets adapted to allow for removal of the freezable dish from the base.

The base can be substantially conical. The base can include one or more high-friction surfaces. The one or more high-friction surfaces can be selected from the group consisting of rubber, polychloroprene, silicone, and polyurethane. The base can be fabricated from a material selected from the group consisting of plastic, rubber, and metal.

The food can be selected from group consisting of a liquid, a solid, a gel, and a slurry. The liquid can be water.

Another aspect of the invention provides a method for feeding a subject. The method includes: providing a feeding dish including a freezable dish adapted to receive food and a base adapted to receive the freezable dish, cooling the freezable dish, placing the food in the freezable dish, and placing the freezable dish in the base.

This aspect of the invention can have a variety of embodiments. The subject can be an animal selected from the group consisting of: a dog, a cat, a rodent, a reptile, a horse, a cow, a sheep, a goat, a camel, a giraffe, a tiger, a lion, a bear, a deer, and a moose.

The step of cooling the freezable dish can include placing the freezable dish in a freezer.

The feeding dish can include a flange adapted to rest on a portion of the base when the freezable dish is placed within the base. The base can include one or more gussets adapted to allow for removal of the freezable dish from the base.

The feeding dish can include a freezable dish adapted to receive food and a base adapted to receive the freezable dish. The freezable dish can include a flange adapted to rest on a portion of the base when the freezable dish is placed within the base.

Another aspect of the invention provides a method for feeding a subject. The method includes: providing a feeding dish including a freezable dish adapted to receive food and a base adapted to receive the freezable dish; cooling the freezable dish; placing the food in the freezable dish; and placing the freezable dish in the base. The freezable dish includes a flange adapted to rest on a portion of the base when the freezable dish is placed within the base.

Another aspect of the invention provides a feeding dish including: a freezable dish adapted to receive food and a base adapted to receive the freezable dish. The base includes one or more gussets adapted to allow for removal of the freezable dish from the base.

Another aspect of the invention provides a method for feeding a subject. The method includes: providing a feeding dish including a freezable dish adapted to receive food and a base adapted to receive the freezable dish; cooling the freezable dish; placing the food in the freezable dish; and placing the freezable dish in the base. The base includes one or more gussets adapted to allow for removal of the freezable dish from the base.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein.

DEFINITIONS

The instant invention is most clearly understood with reference to the following definitions:

As used herein, the singular form "a", "an" and "the" include plural references unless the context clearly dictates otherwise.

As used herein, the term "food" includes any nourishing substance that is eaten or drunk. Foods include solids, liquids, gels, and slurries. For example, liquid foods can include water or dairy products such as milk or cream. Foods can be foods that are typically consumed by humans or can be foods that are typically consumed by animals. For example, foods can be wet or dry dog food.

As used herein, the term "animal" can include any organism in the kingdom Animalia. For example, the term "animal" can include animals commonly kept as pets (e.g., dogs, cats, rodents, reptiles, and the like), farm animals (e.g., horses, cows, sheep, goats, and the like), zoo animals (e.g., camels, giraffes, tigers, lions, bears, deer, moose, and the like), and the like.

DETAILED DESCRIPTION OF THE INVENTION

Feeding dishes and methods of feeding a subject are provided.

Figure 1A:
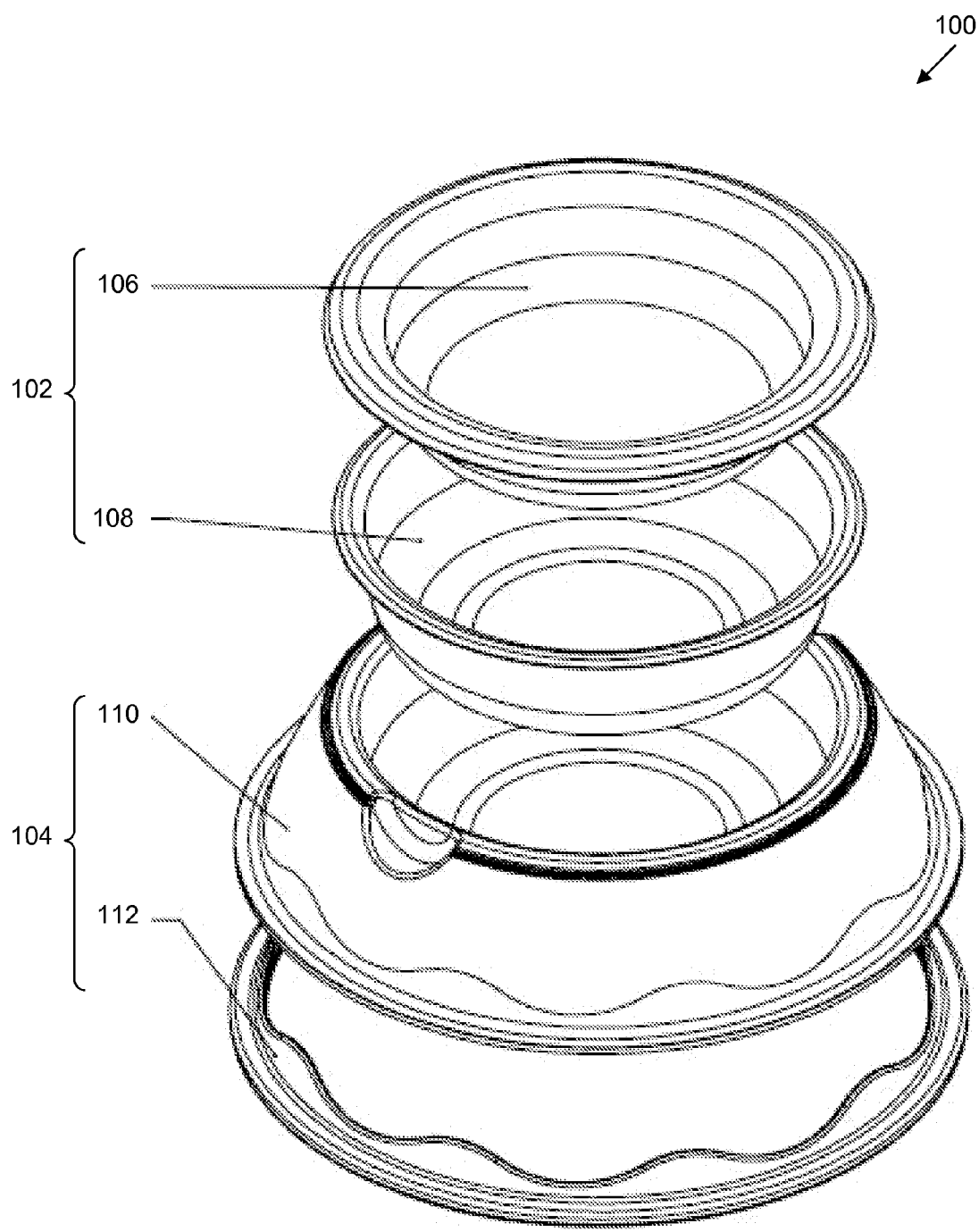
FIGS. 1A, 1B, and 1C depict an exploded view, a side view, and a cross-sectional view of a feeding dish according to one embodiment of the invention.
Figure 1B:
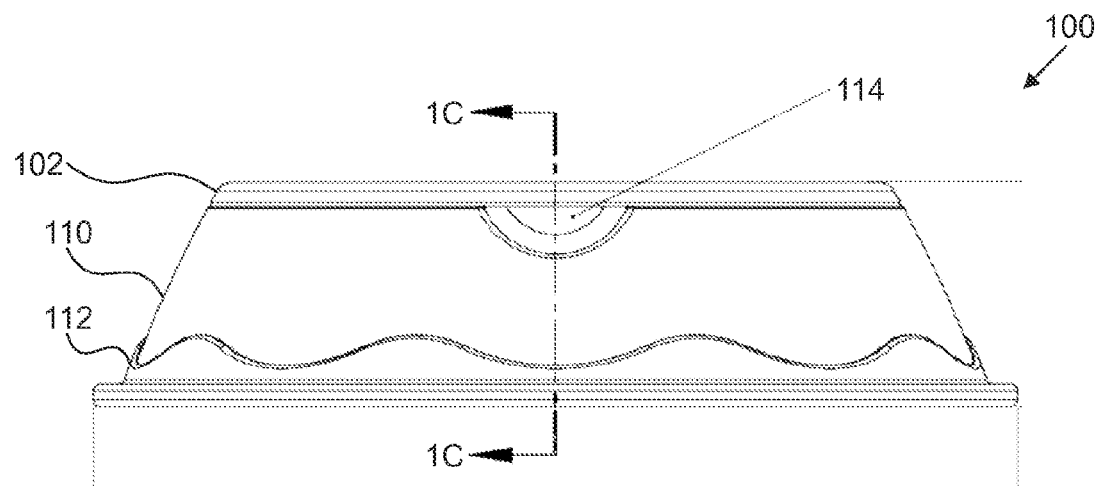
Figure 1C:
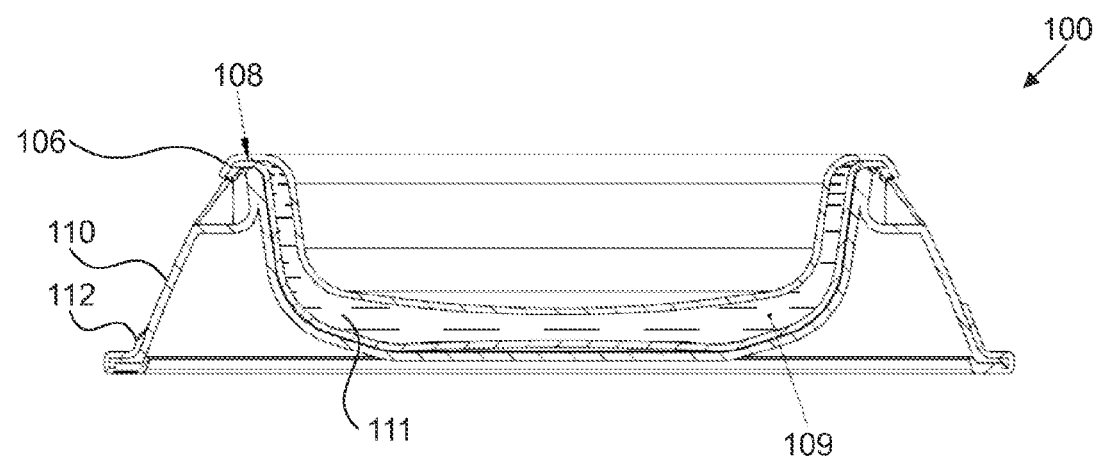

Referring now to FIG. 1, a feeding dish 100 is provided according to one embodiment of the invention. The feeding dish 100 generally includes a freezable dish 102 and a base 104.

The freezable dish 102 can be any dish capable of holding food. For example, the freezable dish 102 can be a bowl, a plate, and the like. (As one of ordinary skill in the art will readily appreciate, a plate is shallow dish and a bowl is a rather deep dish.)

The freezable dish 102 can have a variety of dimensions to accommodate a variety of foods and users. For example, the freezable dish 102 can have an internal diameter of between about 3" and about 4", between about 4" and about 5", between about 5" and about 6", between about 6" and about 7", between about 7" and about 8", between about 8" and about 9", between about 9" and about 10", between about 10" and about 11", between about 11" and about 12", between about 12" and about 18", between about 18" and about 24", and the like. The freezable dish 102 can have a internal depth of between about 1" and 2", between about 2" and 3", between about 3" and 4", between about 4" and 5", between about 5" and 6", between about 6" and 7", between about 7" and 8", between about 8" and 9", between about 9" and 10", between about 10" and 11", between about 11" and 12", and the like.

The freezable dish 102 can include an inner wall 106 and an outer wall 108. The inner wall 106 and the outer wall 108 can be coupled together to define a cavity 109 adapted to receive and contain a freezable substance 111 as discussed herein. The inner wall 106 and the outer wall 108 can be the same, similar, or different materials. For example, one or both of the inner wall 106 and the outer wall 108 can be plastic, rubber, metal, and the like. For example, the inner wall 106 and the outer wall 108 can be formed from polymeric materials such as polypropylene (PP), polyethylene terephthalate (PET), polycarbonate (PC), copolyesters (e.g., PTCG and copolyesters available under the TRITAN™ mark from Eastman Chemical Company of Kingsport, Tenn.) polyphthalate carbonate (PPC), and the like.

The inner wall 106 and the outer wall 108 can be coupled in a variety of means include mechanical fasteners, welding (e.g., sonic welding), adhesives, the like.

The freezable substance can be one or more liquids, gels, solids, slurries, and the like. Preferably, the freezable substance has a high heat capacity and low thermal expansion. Suitable liquids include water, aqueous solutions (e.g., solutions of water and ammonium nitrate, calcium chloride, ammonium chloride), and like. Suitable gels can include glycerin, propylene glycol (such as those available under the BLUE ICE® trademark from Rubbermaid Incorporated of Atlanta, Ga.), hydroxyethyl cellulose (such as those available under the CELLUSIZE™ trademark from The Dow Chemical Company of Midland, Mich.), silica gel, and the like. Preferably, the freezable substance is non-toxic.

Base 104 can have a variety of shapes. Preferably the dimensions of the bottom of base 104 are larger than the top of the base 104. For example, as depicted in FIG. 1, the base 104 can be substantially conical.

Base 104 can be fabricated from an upper member 110 and a lower member 112. Upper member can be fabricated from a variety of materials such as plastics, rubbers, metals, and the like. Additionally or alternatively, base 104 can include one or more high-friction surfaces. For example, upper member 110 and/or lower member 112 can include non-skid polymers such as rubber, polychloroprene (also known as neoprene), silicone, polyurethanes (available, for example, under the SORBOTHANE® trademark from Sorbo, Inc. of Twinsburg, Ohio), and the like. In some embodiments, base 104 can include one or more weights (e.g., lead, rocks, plates, and the like) to further limit movement.

Figure 2:
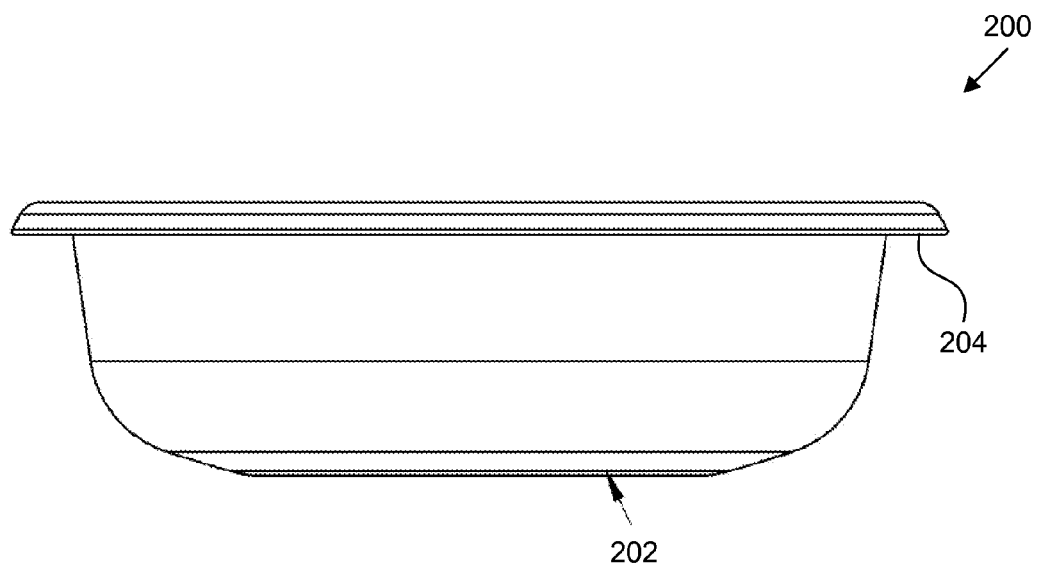
FIG. 2 depicts a freezable dish according to one embodiment of the invention.

Referring now to FIG. 2, a freezable dish 200 according to one embodiment of the invention is depicted. The freezable dish 200 can include a substantially flat bottom portion 202 so that the freezable dish 200 can be used independently of base 104. Freezable dish 200 can also include a flange 204 adapted to rest on a portion of the base 104 when the freezable dish 200 is placed within the base 104. The relative dimensions of the freezable dish 200, flange 204, and base 104 can be configured such that the freezable dish 200 is substantially stationary when placed in the base and subjected to various force such as bumps from a dog's snout during feeding.

Referring again to FIG. 1, base 104 can include one or more gussets 114 or other features that allow for easy removal of the freezable dish 102 from the base 104 for cleaning, freezing, and the like.

The feeding dish 100 described herein can be used for a variety of foods. For example, feeding dish 100 can be used for foods typically consumed by humans, animals, and the like. The foods can be in the form of liquids, solids, gels, slurries, and the like. Exemplary liquids include water, dairy products (e.g., milk or cream), and the like.

Figure 3:
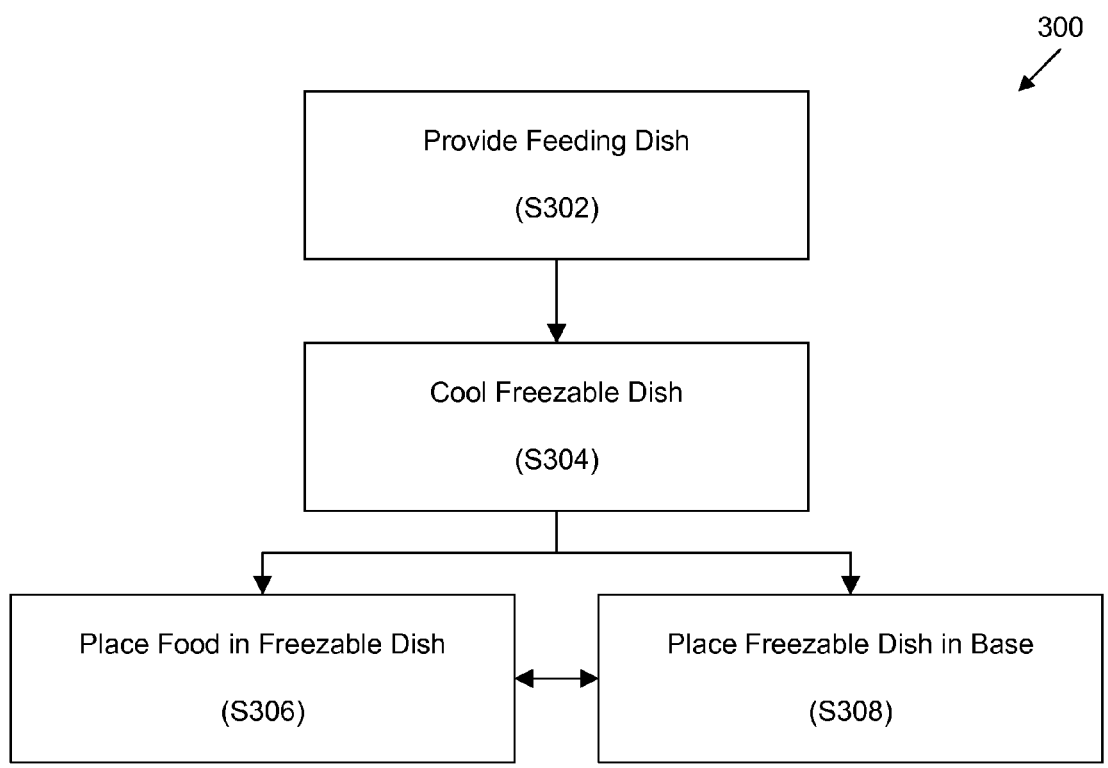
FIG. 3 depicts a method of feeding a subject according to one embodiment of the invention.

Referring now to FIG. 3, a method 300 for feeding a subject is provided.

In step S302, a feeding dish is provided. The feeding dish can include a freezable dish adapted to receive food and a base adapted to receive the freezable dish as discussed herein.

In step S304, the freezable dish is cooled. The freezable dish can be cooled to a variety of temperature achievable with conventional residential refrigerators. For example, the freezable dish can be cooled to between about −5° F. and about 0° F., between about 0° F. and about 5° F., between about 5° F. and about 10° F., between about 10° F. and about 15° F., between about 15° F. and about 20° F., between about 20° F. and about 25° F., between about 25° F. and about 30° F., between about 30° F. and about 35° F., between about 35° F. and about 40° F., between about 40° F. and about 45° F., between about 45° F. and about 50° F., and the like.

In step S306, food is placed in the freezable dish.

In step S308, the freezable dish is optionally placed in the base.

Simultaneous Use of Base and Freezable Dish for Feeding

In some embodiments, the base and the freezable dish can be used simultaneously for feeding. In such an embodiment, the freezable dish is removed from the base and placed on a surface. The same or different foods can be placed in the base and in the freezable dish. For example, the water can be placed in the freezable dish and pet food can be placed in the base or vice versa.

Rate-Limiting Feeding Dishes

In some embodiments, inner wall 106 of the freezable dish 102 and/or the upper member 110 of base 104 can include one or more obstructions extending into food-receiving regions of freezable dish 102 and base 104, respectively. Such obstructions slow the subject's rate of eating, thereby reducing the likelihood of overeating and associated medical problems. Examples of suitable obstructions include protrusions, ridges, and the like and are described in U.S. Design Pat. No. D201,670 to Moore and U.S. Pat. No. 7,207,291 to Watts.

The obstructions can be complimentary such that obstructions in the base 104 mate with obstructions in freezable dish 102 when the freezable dish 102 is inserted into base 104. The freezable substance can, in some embodiments, extend into one or more of the obstructions, thereby utilizing the additional surface area of the obstructions to promote heat transfer between the freezable substance and the food.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A feeding dish comprising:
a freezable dish provided as a bowl having sidewalls and a substantially flat bottom portion, and configured to receive food, the freezable dish comprising:
an inner wall;
an outer wall coupled to the inner wall; and
a freezable substance received between the inner wall and the outer wall such that the freezable substance is received within the sidewalls and the bottom portion of the bowl; and
a base including an upper member and a lower member, the upper member being contained within the lower member, the base being adapted to receive the freezable dish, and the base having dimensions that increase from a top to a bottom of the base,
wherein the freezable dish is configured to be placed in and removed from the base, and
the freezable dish includes a flange forming the circumference of the freezable dish and provided on an entire periphery of the freezable dish, and adapted to rest on the upper member of the base such that the flange extends over and at least partially around the upper member when the freezable dish is placed within the base.

2. The feeding dish of claim 1, wherein the freezable substance is selected from the group consisting of: a liquid, a solid, a gel, and a slurry.

3. The feeding dish of claim 1, wherein the inner wall and the outer wall are coupled by sonic welding.

4. The feeding dish of claim 1, wherein the inner wall is fabricated from a material selected from the group consisting of: plastic, rubber, and metal.

5. The feeding dish of claim 1, wherein the outer wall is fabricated from a material selected from the group consisting of: plastic, rubber, and metal.

6. The feeding dish of claim 1, wherein the base includes one or more gussets adapted to allow for removal of the freezable dish from the base.

7. The feeding dish of claim 1, wherein the base is substantially conical.

8. The feeding dish of claim 1, wherein the base is fabricated from a material selected from the group consisting of plastic, rubber, and metal.

9. The feeding dish of claim 1, wherein the food is selected from group consisting of a liquid, a solid, a gel, and a slurry.

10. The feeding dish of claim 9, wherein the liquid is water.

11. A method for feeding a subject, the method comprising:
providing a feeding dish according to claim 1;
cooling the freezable dish;
placing the food in the freezable dish; and
placing the freezable dish in the base.

* * * * *